United States Patent
Nagarajan et al.

(10) Patent No.: US 12,407,536 B2
(45) Date of Patent: Sep. 2, 2025

(54) SYSTEM AND METHOD FOR EXCHANGING DATA BETWEEN BLOCKCHAIN NETWORKS

(71) Applicant: Bank of America Corporation, Charlotte, NC (US)

(72) Inventors: Divya Nagarajan, Chennai (IN); Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 161 days.

(21) Appl. No.: 18/479,976

(22) Filed: Oct. 3, 2023

(65) Prior Publication Data

US 2025/0112796 A1    Apr. 3, 2025

(51) Int. Cl.
H04L 9/00 (2022.01)
H04L 9/32 (2006.01)

(52) U.S. Cl.
CPC .............. H04L 9/50 (2022.05); H04L 9/3226 (2013.01); H04L 9/3247 (2013.01)

(58) Field of Classification Search
CPC ....... H04L 9/50; H04L 9/3226; H04L 9/3247; H04L 9/3239
See application file for complete search history.

(56) References Cited

U.S. PATENT DOCUMENTS

| | | | |
|---|---|---|---|
| 7,110,545 B2 | 9/2006 | Furuya et al. | |
| 7,693,278 B2 | 4/2010 | Hiramatsu et al. | |
| 8,259,934 B2 | 9/2012 | Karroumi et al. | |
| 9,673,976 B2 | 6/2017 | Willoughby | |
| 10,354,236 B1 | 7/2019 | Wang | |
| 10,708,042 B1* | 7/2020 | Rubenstein | H04L 9/0643 |
| 11,144,918 B2 | 10/2021 | Zhang et al. | |
| 11,212,102 B2 | 12/2021 | Ortiz et al. | |
| 11,257,077 B2* | 2/2022 | Agrawal | G06Q 20/3827 |
| 11,356,262 B2 | 6/2022 | Pourtabatabaie et al. | |
| 11,687,952 B2* | 6/2023 | Todd | G06Q 30/0201 |
| | | | 705/7.29 |
| 2008/0317243 A1 | 12/2008 | Ramprashad | |
| 2015/0229621 A1 | 8/2015 | Kariman et al. | |
| 2020/0210148 A1* | 7/2020 | Li | G06F 8/35 |
| 2021/0119769 A1 | 4/2021 | Trevethan | |
| 2021/0241372 A1* | 8/2021 | Chen | G06F 16/2379 |
| 2021/0320973 A1 | 10/2021 | Basu et al. | |
| 2022/0020018 A1 | 1/2022 | Jivanyan et al. | |

(Continued)

FOREIGN PATENT DOCUMENTS

CN    104850760 A    12/2016

*Primary Examiner* — Chau Le

(57) ABSTRACT

A request is transmitted to a second computing node of a second blockchain network to perform a data interaction between a first computing node of a first blockchain network and the second computing node. Upon receiving an acknowledgement of the request, a first smart contract, an encrypted first network address and a first authentication code is generated. The first smart contract is encrypted using the first authentication code to generate an encrypted first smart contract. The encrypted first smart contract, the encrypted first network address and the first authentication code is transmitted to the second computing node. A digital signature is received indicating an approval of the first smart contract. Thereafter, data objects are transmitted to the second computing node as agreed in the first smart contract.

20 Claims, 2 Drawing Sheets

(56) References Cited

U.S. PATENT DOCUMENTS

| | | | |
|---|---|---|---|
| 2022/0036355 A1* | 2/2022 | Cao | H04L 63/04 |
| 2022/0108312 A1 | 4/2022 | Makrides | |
| 2022/0138707 A1* | 5/2022 | Makrides | G06Q 20/38 |
| | | | 705/71 |
| 2022/0141021 A1 | 5/2022 | Makrides | |
| 2022/0383135 A1 | 12/2022 | Singh et al. | |
| 2023/0308302 A1* | 9/2023 | Hasegawa | H04L 9/3213 |
| 2023/0401312 A1* | 12/2023 | Bakshi | G06F 21/554 |
| 2024/0193618 A1* | 6/2024 | Ramos | G06Q 30/0185 |
| 2024/0414010 A1* | 12/2024 | Kurian | H04L 63/0807 |
| 2025/0013790 A1* | 1/2025 | Magerkurth | H04L 9/0825 |

* cited by examiner

SYSTEM AND METHOD FOR EXCHANGING DATA BETWEEN BLOCKCHAIN NETWORKS

TECHNICAL FIELD

The present disclosure relates generally to network communication, and more specifically to a system and method for exchanging data between blockchain networks.

BACKGROUND

Data interactions in decentralized networks such as a blockchain network are becoming increasingly popular. Data security is of utmost importance in any system that supports online data interactions between computing nodes of the system. However, decentralized networks, by their nature, do not have a central entity that is responsible for administering the security of data interactions within the network. Accordingly, data security and governance is a challenge in decentralized systems such as blockchain networks. These challenges become more pronounced when data is exchanged between two different decentralized networks such as two different blockchain networks.

SUMMARY

The system and method implemented by the system as disclosed in the present disclosure provide technical solutions to the technical problems discussed above by providing secure, technology agnostic, and scalable mechanisms for exchanging data between two different blockchain networks.

For example, the disclosed system and methods provide the practical application of exchanging data (e.g., data objects) between a first blockchain network that supports a first type of data objects and a second blockchain network that supports a second type of data objects. Embodiments of the present disclosure describe an example exchange of data objects between a first computing node of the first blockchain network and a second computing node of the second blockchain network. As described in more detail below, the example exchange of data objects between the first computing node and the second computing includes the first computing node transmitting a first amount of the first type of data objects in exchange for receiving a second amount of the second type of data objects from the second computing node. The first computing node requests the second computing node to perform a data interaction (e.g., a data exchange). In response to receiving an acknowledgement of the request, the first computing node generates and transmits to the second computing node, an encrypted first smart contract, an encrypted first network address and a first authentication code. The first smart contract includes a first transformation rule that specifies how many of the first type of data objects are to be transmitted in exchange for how many of the second type of data objects. The first smart contract is encrypted using the first authentication code and cannot be decrypted without the first authentication code. The first network address is an address within the first blockchain network where the first type of data objects are stored. The first network address is encrypted and cannot be decrypted without an access token. The second computing node decrypts the first smart contract using the first authentication code and reviews the first transformation rule. Upon determining that the first transformation rule is acceptable, the second computing node transmits back a first digital signature along with the first authentication code received from the first computing node. The first computing node receives the first digital signature and the first authentication code from the second computing node and validates the first digital signature by matching the first authentication code received with the first digital signature with the one that was previously transmitted to the second computing node. Upon successfully validating the first digital signature, the first computing node transmits a first access token to the second computing node. The second computing node decrypts the previously received first network address using the first access token and receives the first type of data objects from the first network address within the first blockchain network.

Similarly, the second computing node transmits to the first computing node, an encrypted second network address within the second blockchain network where the second type of data objects are stored, and separately transmits a second access token needed to decrypt the second network address. The first computing node decrypts the second network address using the second access token and receives the second type of data objects from the second network address within the second blockchain network.

Additionally, transmissions between the first blockchain network and the second blockchain network are encoded using a synthetic DNA synthesis process. This adds another layer of data security.

Thus, the disclosed system and method provide several layers of data security with regard to data exchange between the first blockchain network and the second blockchain network. These data security layers include encrypted smart contracts, encrypted network addresses, validation of digital signatures by matching authentication codes, and encoding data transmissions using a synthetic DNA synthesis process. Thus, the disclosed system and method improve data and network security. In addition, by allowing secure data exchanges between two different blockchain networks, the disclosed system and method save network bandwidth and processing resources which would otherwise be used to detect, identify and resolve data theft. This improves processing and network performance. Further, the disclosed system and method allow data exchange between blockchain networks that support different technologies (e.g., different type of data objects), and thus are technology agnostic. Thus, the disclosed system and methods generally improve blockchain technology and technology related to network security.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
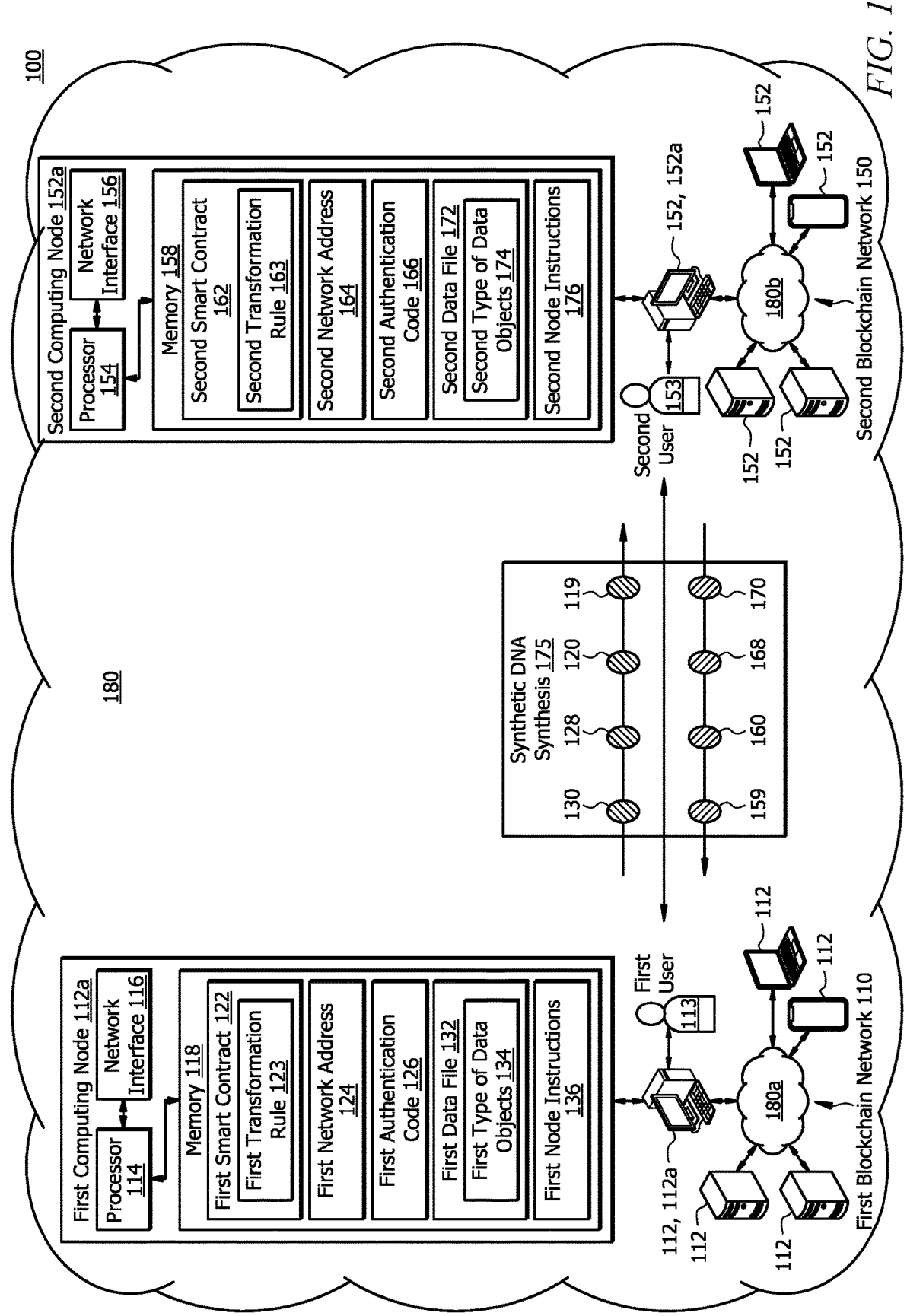
FIG. 1 is a schematic diagram of a system, in accordance with certain aspects of the present disclosure.

FIG. 1 is a schematic diagram of a system 100, in accordance with certain aspects of the present disclosure. As shown, system 100 includes a first blockchain network 110 and a second blockchain network 150 connected to a network 180. In one embodiment, the first blockchain network 110 is a part of the network 180 and includes a plurality of computing nodes 112 connected to a portion 180a of the network 180. Similarly, the second blockchain network 110 is a part of the network 180 and includes a plurality of computing nodes 152 connected to another portion 180b of the network 180. It may be noted that portions 180a and 180b of the network 180 may at least partially overlap. In one or more embodiments, while the first blockchain network 110 and the second blockchain network 150 are connected to the same network 180, the first blockchain network 110 and the second blockchain network 150 operate independently. For example, data interactions performed within the first blockchain network 110 are recorded in the first blockchain network (e.g., in a first blockchain ledger (not shown) associated with the first blockchain network) and not recorded in the second blockchain network 150. Similarly, data interactions performed within the second blockchain network 150 are recorded in the second blockchain network (e.g., in a second blockchain ledger (not shown) associated with the second blockchain network) and not recorded in the first blockchain network 110.

In one embodiment, the first blockchain network 110 supports a first type of data objects (e.g., data objects 134) and the second blockchain network 150 supports a second type of data objects (e.g., data objects 174) that is different from the first type of data objects 134. This means that computing nodes 112 of the first blockchain network 110 may perform data interactions within the first blockchain network 110 based on the first type of data objects 134. Similarly computing nodes 152 of the second blockchain network 150 may perform data interactions within the second blockchain network 150 based on the second type of data objects 174. In other words, data interactions occurring within the first blockchain network 110 may be based only on the first type of data objects 134 and data interactions occurring within the second blockchain network 150 may be based only on the second type of data objects 174. In the context of the present disclosure, the term "data interaction" may refer to transmitting data objects 134, 174 by a computing node 112, 152, receiving data objects 134, 174 by a computing node 112, 152, or exchanging data objects 134, 174 between two computing nodes 112, 152.

In one or more embodiments, the computing nodes 112 and 152 may include, but are not limited to, desktop computers, smartphones, tablet computers, laptop computers, servers and data centers, mainframe computers, virtual reality (VR) headsets, augmented reality (AR) glasses and other hardware devices such as printers, routers, hubs, switches, and memory devices all connected to the network 180. In one embodiment, at least a portion of the first blockchain network 110 and/or the second blockchain network 150 may be representative of an Information Technology (IT) infrastructure of an organization. In one example, the first blockchain network 110 may be owned and/or managed by a first entity and the second blockchain network 150 may be owned and/or managed by a second entity that is different from and is independent of the first entity.

One or more of the computing nodes 112, 152 may be operated by users. For example, a computing node 112, 152 may provide a user interface using which a user may operate the computing node 112, 152 to perform data interactions within the respective first blockchain network 110 or the second blockchain network 150 to which the computing node 112, 152 is part of. For example, as shown in FIG. 1, a first user 113 may operate computing node 112a of the first blockchain network 110 and a second user 153 may operate a computing node 152a of the second blockchain network 150.

One or more computing nodes 112, 152 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 112, 152 may be representative of a server running one or more software applications to implement a respective functionality. In certain embodiments, one or more of the computing nodes 112, 152 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

Embodiments of the present describe techniques for exchanging data objects 134, 174 between computing nodes 112, 152 of the first blockchain network 110 and the second blockchain network 150. More specifically, embodiments of the present disclosure describe an example exchange of data objects 134, 174 between a first computing node 112a of the first blockchain network 110 and a second computing node 152a of the second blockchain network 150. As described in more detail below, the example exchange of data objects 134, 174 between the first computing node 112a and the second computing node 152a includes the first computing node 112a transmitting a first amount of the first type of data objects 134 belonging to the first user 113 in exchange for receiving a second amount of the second type of data objects 174 from the second computing node 152a.

The first computing node 112a includes a processor 114, a memory 118, and a network interface 116. The first computing node 112a may be configured as shown in FIG. 1 or in any other suitable configuration.

The processor 114 includes one or more processors operably coupled to the memory 118. The processor 114 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 114 may be a programmable logic device, a microcontroller, a microprocessor, or any suitable combination of the preceding. The processor 114 is communicatively coupled to and in signal communication with the memory 118. The one or more processors are configured to process data and may be implemented in hardware or software. For example, the processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., first node instructions 136) to implement the first computing node 112a. In this way, processor 114 may be a special-purpose computer designed to implement the functions disclosed herein. In one or more embodiments, the first computing node 112a is implemented using logic units, FPGAs, ASICs, DSPs, or any other suitable hardware. The first computing node 112a is configured to operate as described with reference to FIG. 2. For example, the processor 114 may be configured to perform at least a portion of the method 200 as described in FIG. 2.

The memory 118 comprises a non-transitory computer-readable medium such as one or more disks, tape drives, or solid-state drives, and may be used as an over-flow data storage device, to store programs when such programs are selected for execution, and to store instructions and data that are read during program execution. The memory 118 may be volatile or non-volatile and may comprise a read-only memory (ROM), random-access memory (RAM), ternary content-addressable memory (TCAM), dynamic random-access memory (DRAM), and static random-access memory (SRAM).

The memory 118 is operable to store a first smart contract 122, a first encrypted network address 124, a first authentication code 126, a first data file 132, a first type of data objects 134 and first node instructions 136. The first node instructions 136 may include any suitable set of instructions, logic, rules, or code operable to execute the first computing node 112a.

The network interface 116 is configured to enable wired and/or wireless communications. The network interface 116 is configured to communicate data between the first computing node 112a and other devices, systems, or domains (e.g., second computing node 152a and/or other computing nodes 112 and 152). For example, the network interface 116 may comprise a Wi-Fi interface, a LAN interface, a WAN interface, a modem, a switch, or a router. The processor 114 is configured to send and receive data using the network interface 116. The network interface 116 may be configured to use any suitable type of communication protocol as would be appreciated by one of ordinary skill in the art.

The second computing node 152a includes a processor 154, a memory 158, and a network interface 156. The second computing node 152a may be configured as shown in FIG. 1 or in any other suitable configuration.

The processor 154 includes one or more processors operably coupled to the memory 158. The processor 154 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 154 may be a programmable logic device, a microcontroller, a microprocessor, or any suitable combination of the preceding. The processor 154 is communicatively coupled to and in signal communication with the memory 158. The one or more processors are configured to process data and may be implemented in hardware or software. For example, the processor 154 may be 8-bit, 16-bit, 32-bit, 64-bit or of any other suitable architecture. The processor 154 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., second node instructions 176) to implement the second computing node 152a. In this way, processor 154 may be a special-purpose computer designed to implement the functions disclosed herein. In one or more embodiments, the second computing node 152a is implemented using logic units, FPGAs, ASICs, DSPs, or any other suitable hardware. The second computing node 152a is configured to operate as described with reference to FIG. 2. For example, the processor 154 may be configured to perform at least a portion of the method 200 as described in FIG. 2.

The memory 158 comprises a non-transitory computer-readable medium such as one or more disks, tape drives, or solid-state drives, and may be used as an over-flow data storage device, to store programs when such programs are selected for execution, and to store instructions and data that are read during program execution. The memory 158 may be volatile or non-volatile and may comprise a read-only memory (ROM), random-access memory (RAM), ternary content-addressable memory (TCAM), dynamic random-access memory (DRAM), and static random-access memory (SRAM).

The memory 158 is operable to store a second smart contract 162, a second encrypted network address 164, a second authentication code 166, a second data file 172, a second type of data objects 174 and second node instructions 176. The second node instructions 176 may include any suitable set of instructions, logic, rules, or code operable to execute the second computing node 152a.

The network interface 156 is configured to enable wired and/or wireless communications. The network interface 156 is configured to communicate data between the second computing node 152a and other devices, systems, or domains (e.g., first computing node 112a and/or other computing nodes 112 and 152). For example, the network interface 156 may comprise a Wi-Fi interface, a LAN interface, a WAN interface, a modem, a switch, or a router. The processor 154 is configured to send and receive data using the network interface 156. The network interface 156 may be configured to use any suitable type of communication protocol as would be appreciated by one of ordinary skill in the art.

It may be noted that each of the computing nodes 112 and 152 may be implemented like the first computing node 112a and the second computing node 152a shown in FIG. 1. For example, each of the computing nodes 112 and 152 may have a respective processor and a memory that stores data and instructions to perform operations discussed above.

The first computing node 112a of the first blockchain network 110 may be configured to perform a data interaction with the second computing node 152a of the second blockchain network 150 to exchange data objects with the second computing node 152a. This exchange of data objects may include the first computing node 112a transmitting a first amount of the first type of data objects 134 in exchange for receiving a second amount of the second type of data objects 174 from the second computing node 152a. In this context, the first user 113 may store a first data file 132 at the first computing node 112a owned and/or operated by the first user 113. In the first data file 132, the first user 113 may store the first type of data objects 134 owned by the first user 113. Similarly, the second user 153 may store a second data file 172 at the second computing node 152a owned and/or operated by the second user 153. In the second data file 172, the second user 153 may store the second type of data objects 174 owned by the second user 153.

To initiate the data exchange with the second computing node 152a, the first computing node 112a may be configured to transmit to the second computing node 152a, a request 119 to perform a data interaction with the second computing node 152. The request 119 may indicate that the requested data interaction relates to exchanging data (e.g., data objects) between the first user 113 and the second user 153. In one embodiment, the first user 113 may trigger the generation and transmission of the request 119 by the first computing node 112a. In response to receiving the request 119 from the first computing node 112a, the second computing node 152a may generate and transmit an acknowledgement 159 to the first computing node 112a indicating that the second computing node 152a is ready to perform the requested data interaction with the first computing node 112a. In one embodiment, the acknowledgement may be automatically generated by the second computing node 152a or manually triggered by the second user 153. For example, the second user 153 review the request 119 received by the second computing node 152a and trigger the generation and transmission of the acknowledgement 159 to the first computing node 112a.

Upon receiving the acknowledgement 159 from the second computing node 152a, the first computing node 112a may be configured to generate a first smart contract 122 that includes information relating to the data interaction. For example, the first smart contract 122 may include a first transformation rule 123 indicating that the first computing node 112a is to transmit a first amount of the first type of data objects belonging to the first user 113 in exchange for a second amount of the second type of data objects belonging to the second user 153 that is to be received from the second computing node 152a. In addition, the first computing node 112a generates a first authentication code 126 that is unique to the data interaction initiated between the first computing node 112a and the second computing node 152a. The first computing node 112a encrypts the first smart contract 122 using the first authentication code 126. In one embodiment, the first computing node 112a encrypts the first smart contract 122 based on an encrypt-decrypt algorithm previously agreed with the second computing node 152a. As further described below, this allows the second computing node 152a to decrypt the first smart contract 122 using the first authentication code 126 based on the same encrypt-decrypt algorithm previously agreed with the first computing node 112a. Essentially, the first authentication code 126 acts as a unique key that can be used by the second computing node 152a to access and review the first smart contract 122. The first authentication code 126 may include any known code such as an alphanumeric code. In addition, the first computing node 112a generates an encrypted first network address 124 of a memory location within the first blockchain network 110 where the first type of data objects 134 associated with the first user 113 are stored. The first type of data objects 134 associated with the first user 113 may be stored at the first computing node 112a or at any other computing node 112 of the first blockchain network 110.

The first computing node 112a may transmit the first smart contract 122 encrypted using the first authentication code 126, the encrypted first network address 124, and the first authentication code 126 to the second computing node 152a. In one embodiment, the first computing node 112a transmits the encrypted first smart contract 122, the encrypted first network address 124, and the first authentication code 126 in a single encoded first data file 120. In alternative embodiments, the first computing node 112a transmits the encrypted first smart contract 122, the encrypted first network address 124, and the first authentication code 126 as separate data files.

Upon receiving the encrypted first smart contract 122, the encrypted first network address 124, and the first authentication code 126 from the first computing node 112a, the second computing node 152a may be configured to decrypt the first smart contract 122 using the first authentication code 126. As described above, the second computing node 152a may decrypt the first smart contract 122 based on the encrypt-decrypt algorithm previously agreed with the first computing node 112a. After decrypting the first smart contract 122, the second computing node 152a may extract the first transformation rule 123 included in the first smart contract 122 and determine whether the first transformation rule 123 is acceptable. In one embodiment, the second computing node 152a may determine whether the first transformation rule 123 is acceptable based on a pre-configured rule set for the second blockchain network 150 relating to data exchanges between a computing node 152 of the second blockchain network 150 and a computing node 112 of the first blockchain network. For example, the pre-configured rule set for the second blockchain network 150 may specify that at least X amount of the first type of data objects is to be received for a unit amount of the second type of data objects. The second computing node 152a analyzes the first transformation rule 123 based on this pre-configured rule to determine whether the first transformation rule 123 is acceptable. As mentioned above, the first transformation rule 123 indicates that that the first computing node 112a is to transmit a first amount of the first type of data objects belonging to the first user 113 in exchange for a second amount of the second type of data objects 174 belonging to the second user 153 that is to be received from the second computing node 152a. When the first transformation rule 123 satisfies the pre-configured rule set for the second blockchain network 150, the second computing node 152a determines that the first transformation rule 123 is acceptable. For example, based on the first transformation rule 123, when at least X amount of the first type of data objects 134 is to be received for a unit amount of the second type of data objects 174, the second computing node 152a determines that the first transformation rule 123 is acceptable and approves the first transformation rule 123.

It may be noted that the encrypted first network address 124 cannot be decrypted by the second computing node 152a at this stage. The encrypted first network address 124 is configured to be decrypted by a unique access token (e.g., first access token 130) which, as described below, the first computing node 112a is configured to transmit to the second computing node 152a at a later stage.

In response to determining that the first transformation rule 123 is acceptable, the second computing node generates and transmits a first digital signature 168 to the first computing node 112a. The first digital signature 168 indicates to the first computing node 112a that the second computing node 152a has approved the first transformation rule 123 that was included in the first smart contract 122. In one embodiment, the second computing node 152a transmits the first digital signature 168 along with the first authentication code 126 that was previously received by the second computing node 152a from the first computing node 112a. This allows the first computing node 112a to validate the first digital signature 168 and map it to the particular data interaction that was requested via request 119 (e.g., since the first authentication code 126 is unique to the particular data interaction). For example, upon receiving the first digital signature 168 and the first authentication code 126, the first computing node 112a compares the first authentication code 126 received from the second computing node 152a to the first authentication code 126 that was generated and transmitted by the first computing node 112a. When the two codes match, the first computing node 112a determines that the first digital signature 168 has been validated and that the first digital signature 168 is an approval of the first transformation rule 123 included in the first smart contract 122. In an additional or alternative embodiment, the second computing node 152a transmits the first digital signature 168 and the first authentication code 126 as part of the first smart contract 122 that was received from the first computing node 112a. In other words, to indicate an approval of the first transformation rule 123, the second computing node 152a transmits back the first smart contract 122 along with the first digital signature 168 and the first authentication code 126.

After validating the first digital signature 168, the first computing node transmits a first access token 130 to the second computing node 152a. The first access token 130 is a key that can be used to decrypt the encrypted first network address 124 that was previously transmitted to the second computing node 152a. As described above, the encrypted first network address 124 is of a memory location within the first blockchain network 110 where the first type of data objects 134 associated with the first user 113 are stored. The second computing node 152a receives the first access token 130 and decrypts the encrypted first network address 124 using the first access token 130 to determine the first network address 124. Thereafter, the second computing node 152a requests the first computing node 112a to transmit the first amount of the first type of data objects 134 belonging to the first user 113 from the first network address 124. For example, the second computing node 152a transmits a request for the first amount of the first type of data objects 134 along with the first network address 124. In response to receiving the request for the first type of data objects 134, the first computing node 112a initiates a transmission of the first amount of the first type of data objects 134 to the second computing node 152a. In one embodiment, the second computing node 152a transmits the request for the first type of data objects 134 to an exchange computing node (an exchange server in the second blockchain network 150) in the second blockchain network 150 that is configured to coordinate data exchange between the first blockchain network 110 and the second blockchain network 150. In an alternative or additional embodiment, the second computing node 152a performs operations relating to the exchange computing node.

The second computing node 152a may be configured to transmit a second network address 164 of a memory location within the second blockchain network 150 where the second data objects 174 owned by the second user 153 are stored. In one embodiment, the second computing node 152a transmits an encrypted second network address 164 and separately transmits a second access token 170 to the first computing node 112a. The second access token 170 is a key that can be used to decrypt the encrypted second network address 164 that was previously transmitted to the first computing node 112a. The first computing node 112a receives the second access token 170 and decrypts the encrypted second network address 164 using the second access token 170 to determine the second network address 164. Thereafter, the first computing node 112a requests the second computing node 152a to transmit the second amount of the second type of data objects 174 belonging to the second user 153 from the second network address 164. For example, the first computing node 112a transmits a request for the second amount of the second type of data objects 174 along with the second network address 164. In response to receiving the request for the second type of data objects 174, the second computing node 152a initiates a transmission of the second amount of the second type of data objects 174 to the first computing node 112a. In one embodiment, the first computing node 112a transmits the request for the second type of data objects 174 to an exchange computing node (e.g., exchange server) within the first blockchain network 110 that is configured to coordinate data exchange between the first blockchain network 110 and the second blockchain network 150. In an alternative or additional embodiment, the first computing node 112a performs operations relating to the exchange computing node of the first blockchain network 110. In one embodiment, the second computing node 152a transmits the encrypted second network address 164 and the second access token 170 after approving the first transformation rule 123 included in the first smart contract 122.

In one or more embodiments, the first computing node 112a and the second computing node 152a may engage in an electronic negotiation process to determine how many of the first type of data objects 134 belonging to the first user 113 are to be exchanged for how many of the second type of data objects 174 belonging to the second user 153. For example, after transmitting the acknowledgement 159 to the first computing node 112a or after receiving the first smart contract 122 from the first computing node 112a, the second computing node 152a generates a second smart contract 162 that includes information relating to the data interaction requested by the first computing node 112a. For example, the second smart contract 162 may include a second transformation rule 163 indicating that the second computing node 152a is to transmit a third amount of the second type of data objects 174 belonging to the second user 153 in exchange for the first amount of the first type of data objects 134 belonging to the first user 113 that is to be received from the first computing node 112a. In one embodiment, the third amount of the second type of data objects 174 associated with the second transformation rule 163 may be same as the second amount of the second type of data objects 174 associated with the first transformation rule 123. In other words, the second transformation rule 163 is same as the first transformation rule 123.

In an alternative embodiment, the third amount of the second type of data objects 174 associated with the second transformation rule 163 may be different from the second amount of the second type of data objects 174 associated with the first transformation rule 123. For example, the second computing node 152a may determine that the first transformation rule 123 included in the first smart contract 122 is not agreeable, and in response, generates the second smart contract 162 that includes the second transformation rule 163 different from the first transformation rule 123.

In addition to generating the second smart contract 162, the second computing node 152a generates a second authentication code 166 that is unique to the data interaction initiated between the first computing node 112a and the second computing node 152a. The second computing node 152*a* encrypts the second smart contract 162 using the second authentication code 166. In one embodiment, the second computing node 152*a* encrypts the second smart contract 162 based on an encrypt-decrypt algorithm previously agreed with the first computing node 112*a*. As further described below, this allows the first computing node 112*a* to decrypt the second smart contract 162 using the second authentication code 166 based on the same encrypt-decrypt algorithm previously agreed with the second computing node 152*a*. Essentially, the second authentication code 166 acts as a unique key that can be used by the first computing node 112*a* to access and review the second smart contract 162. The second authentication code 166 may include any known code such as an alphanumeric code. In addition, the second computing node 152*a* generates an encrypted first network address 164 of a memory location within the second blockchain network 150 where the second type of data objects 174 associated with the second user 153 are stored. The second type of data objects 174 associated with the second user 153 may be stored at the second computing node 152*a* or at any other computing node 152 of the second blockchain network 150.

The second computing node 152*a* may transmit the second smart contract 162 encrypted using the second authentication code 166, the encrypted second network address 164, and the second authentication code 166 to the first computing node 112*a*. In one embodiment, the second computing node 152*a* transmits the encrypted second smart contract 162, the encrypted second network address 164, and the second authentication code 166 in a single encoded second data file 160. In alternative embodiments, the second computing node 152*a* transmits the encrypted second smart contract 162, the encrypted second network address 164, and the second authentication code 166 as separate data files.

Upon receiving the encrypted second smart contract 162, the encrypted second network address 164, and the second authentication code 166 from the second computing node 152*a*, the first computing node 112*a* may be configured to decrypt the second smart contract 162 using the second authentication code 166. As described above, the first computing node 112*a* may decrypt the second smart contract 162 based on the encrypt-decrypt algorithm previously agreed with the second computing node 152*a*. After decrypting the second smart contract 162, the first computing node 112*a* may extract the second transformation rule 173 included in the second smart contract 162 and determine whether the second transformation rule 173 is acceptable. In one embodiment, when the second transformation rule 173 is same as the first transformation rule 123 that was previously transmitted by the first computing node 112*a* as part of the first smart contract 122, the first computing node determines that the second transformation rule 163 is acceptable and approves the second smart contract 162.

In an alternative embodiment, when the second transformation rule 163 is different from the first transformation rule 123, the first computing node 112*a* may determine whether the second transformation rule 173 is acceptable based on a pre-configured rule set for the first blockchain network 110 relating to data exchanges between a computing node 112 of the first blockchain network 110 and a computing node 152 of the second blockchain network 150. For example, the pre-configured rule set for the first blockchain network 110 may specify that at least Y amount of the second type of data objects 174 is to be received for a unit amount of the first type of data objects 134. The first computing node 112*a* analyzes the second transformation rule 173 based on this pre-configured rule to determine whether the second transformation rule 173 is acceptable. As mentioned above, the first transformation rule 173 indicates that that the second computing node 152*a* is to transmit a third amount of the second type of data objects 174 belonging to the second user 153 in exchange for a first amount of the first type of data objects 134 belonging to the first user 113 that is to be received from the first computing node 112*a*. When the second transformation rule 173 satisfies the pre-configured rule set for the first blockchain network 110, the first computing node 112*a* determines that the second transformation rule 173 is acceptable. For example, based on the second transformation rule 173, when at least Y amount of the second type of data objects 174 is to be received for a unit amount of the first type of data objects 134, the first computing node 112*a* determines that the second transformation rule 173 is acceptable and approves the second transformation rule 173.

In certain embodiments, the first computing node 112*a* and the second computing node 152*a* may exchange two or more smart contracts 122, 162 before both the first computing node 112*a* and the second computing node 152*a* agree on a particular transformation rule 123, 163.

In response to determining that the second transformation rule 163 is acceptable, the first computing node generates and transmits a second digital signature 128 to the second computing node 152*a*. The second digital signature 128 indicates to the second computing node 152*a* that the first computing node 112*a* has approved the second transformation rule 163 that was included in the second smart contract 162. In one embodiment, the first computing node 112*a* transmits the second digital signature 128 along with the second authentication code 166 that was previously received by the first computing node 112*a* from the second computing node 152*a*. This allows the second computing node 152*a* to validate the second digital signature 128 and map it to the particular data interaction that was requested via request 119 (e.g., since the second authentication code 166 is unique to the particular data interaction). For example, upon receiving the second digital signature 128 and the second authentication code 166, the second computing node 152*a* compares the second authentication code 166 received from the first computing node 112*a* to the second authentication code 166 that was generated and transmitted by the second computing node 152*a*. When the two codes match, the second computing node 152*a* determines that the second digital signature 128 has been validated and that the second digital signature 128 is an approval of the second transformation rule 163 included in the second smart contract 162. In an additional or alternative embodiment, the first computing node 112*a* transmits the second digital signature 128 and the first authentication code 126 as part of the second smart contract 162 that was received from the second computing node 152*a*. In other words, to indicate an approval of the second transformation rule 163, the first computing node 112*a* transmits back the second smart contract 162 along with the second digital signature 128 and the second authentication code 166.

After validating the second digital signature 128, the second computing node 152*a* transmits a second access token 170 to the first computing node 112*a*. The second access token 170 is a key that can be used to decrypt the encrypted second network address 164 that was previously transmitted to the first computing node 112*a*. As described above, the encrypted second network address 164 is of a memory location within the second blockchain network 150 where the second type of data objects 174 associated with the second user 153 are stored. The first computing node 112a receives the second access token 170 and decrypts the encrypted second network address 164 using the second access token 170 to determine the second network address 164. Thereafter, the first computing node 112a requests the second computing node 152a to transmit the third amount (or second amount whichever is the case) of the second type of data objects 174 belonging to the second user 153 from the second network address 164. For example, the first computing node 112a transmits a request for the third amount (or second amount) of the second type of data objects 174 along with the second network address 164. In response to receiving the request for the second type of data objects 174, the second computing node 152a initiates a transmission of the third amount (or second amount) of the second type of data objects 174 to the first computing node 112a. In one embodiment, the first computing node 112a transmits the request for the second type of data objects 174 to an exchange node (not shown) in the first blockchain network 110 that is configured to coordinate data exchange between the first blockchain network 110 and the second blockchain network 150. In an alternative or additional embodiment, the first computing node 112a performs operations relating to the exchange computing node.

In one or more embodiments, the transmissions between the first computing node 112a and the second computing node 152a are encoded using synthetic (e.g., artificial) DNA synthesis 175 process. For example, the first computing node 112a encodes the encrypted first smart contract 122, the encrypted first network address 124, and the first authentication code 126 using synthetic DNA synthesis to generate an encoded first data file 120, wherein the encoded first data file 120 includes one or more synthetic DNA sequences that represent encoded data. The first computing node 112a transmits the single encoded first data file 120 to the second computing node 152a. The second computing node 152a decodes the one or more synthetic DNA sequences in the encoded first data file 120 to extract the encrypted first smart contract 122, the encrypted first network address 124, and the first authentication code 126.

Similarly, the second computing node 152a encodes the encrypted second smart contract 162, the encrypted second network address 164, and the second authentication code 166 to generate the single encoded second data file 160, wherein the encoded second data file 160 includes one or more synthetic DNA sequences that represent the encoded data. The second computing node 152a transmits the encoded second data file 160 to the first computing node 112a. The first computing node 112a decodes the one or more synthetic DNA sequences in the encoded second data file 160 to extract the encrypted second smart contract 162, the encrypted second network address 164, and the second authentication code 166.

Figure 2:
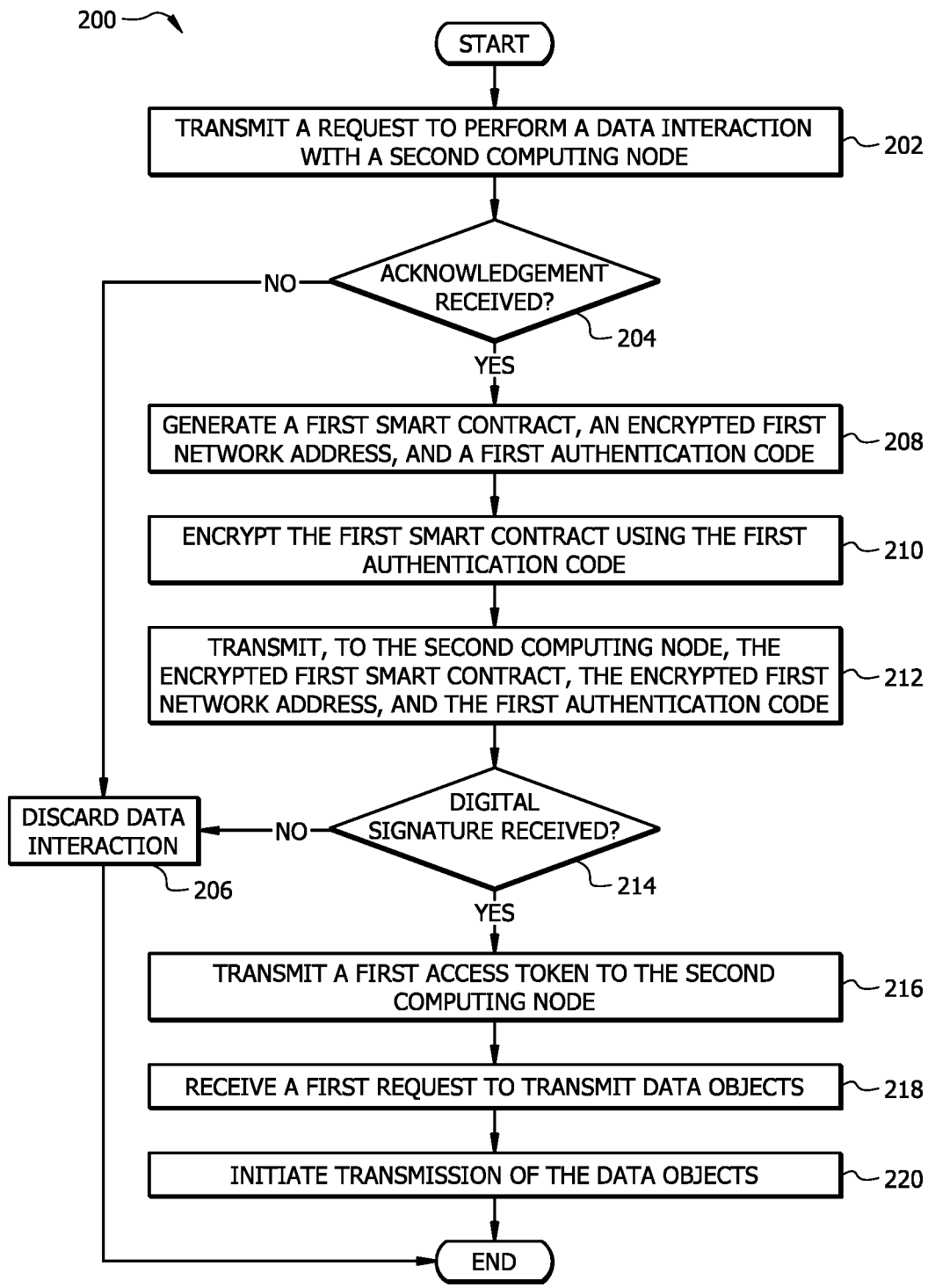
FIG. 2 illustrates a flowchart of an example method for exchanging data between a first blockchain network and a second blockchain network, in accordance with one or more embodiments of the present disclosure.

FIG. 2 illustrates a flowchart of an example method 200 for exchanging data between a first blockchain network 110 and a second blockchain network 150, in accordance with one or more embodiments of the present disclosure. Method 200 may be performed by the first computing node 112a of the first blockchain network 110 shown in FIG. 1.

At operation 202, first computing node 112a transmits, to the second computing node 152a of the second blockchain network 150, a request 119 to perform a data interaction with the second computing node 152a, wherein the data interaction comprises exchange of data (e.g., data objects 134, 174) between the first computing node 112a and the second computing node 152a.

As described above, the first computing node 112a of the first blockchain network 110 may be configured to perform a data interaction with the second computing node 152a of the second blockchain network 150 to exchange data objects with the second computing node 152a. This exchange of data objects may include the first computing node 112a transmitting a first amount of the first type of data objects 134 in exchange for receiving a second amount of the second type of data objects 174 from the second computing node 152a. In this context, the first user 113 may store a first data file 132 at the first computing node 112a owned and/or operated by the first user 113. In the first data file 132, the first user 113 may store the first type of data objects 134 owned by the first user 113. Similarly, the second user 153 may store a second data file 172 at the second computing node 152a owned and/or operated by the second user 153. In the second data file 172, the second user 153 may store the second type of data objects 174 owned by the second user 153.

To initiate the data exchange with the second computing node 152a, the first computing node 112a may be configured to transmit to the second computing node 152a, a request 119 to perform a data interaction with the second computing node 152a. The request 119 may indicate that the requested data interaction relates to exchanging data (e.g., data objects 134, 174) between the first user 113 and the second user 153. In one embodiment, the first user 113 may trigger the generation and transmission of the request 119 by the first computing node 112a.

At operation 204, if an acknowledgement 159 is not received from the second computing node 152a (e.g., within a pre-configured time of transmitting the request 119), method 200 proceeds to operation 206 where the first computing node 112a discards the requested data interaction and the method 200 ends here. On the other hand, if an acknowledgement 159 is received from the second computing node 152a, method 200 proceeds to operation 208.

As described above, in response to receiving the request 119 from the first computing node 112a, the second computing node 152a may generate and transmit an acknowledgement 159 to the first computing node 112a indicating that the second computing node 152a is ready to perform the requested data interaction with the first computing node 112a. In one embodiment, the acknowledgement 159 may be automatically generated by the second computing node 152a or manually triggered by the second user 153. For example, the second user 153 may review the request 119 received by the second computing node 152a and trigger the generation and transmission of the acknowledgement 159 to the first computing node 112a.

At operation 208, first computing node 112a generates a first smart contract 122, an encrypted first network address 124, and a first authentication code 126.

As described above, upon receiving the acknowledgement 159 from the second computing node 152a, the first computing node 112a may be configured to generate a first smart contract 122 that includes information relating to the data interaction. For example, the first smart contract 122 may include a first transformation rule 123 indicating that the first computing node 112a is to transmit a first amount of the first type of data objects 134 belonging to the first user 113 in exchange for a second amount of the second type of data objects 174 belonging to the second user 153 that is to be received from the second computing node 152a. In addition, the first computing node 112a generates a first authentication code 126 that is unique to the data interaction initiated between the first computing node 112a and the second computing node 152a. The first authentication code 126 may include any known code such as an alphanumeric code. In addition, the first computing node 112a generates an encrypted first network address 124 of a memory location within the first blockchain network 110 where the first type of data objects 134 associated with the first user 113 are stored. The first type of data objects 134 associated with the first user 113 may be stored at the first computing node 112a or at any other computing node 112 of the first blockchain network 110.

At operation 210, first computing node 112a encrypts the first smart contract 122 using the first authentication code 126 to generate an encrypted first smart contract 122.

In one embodiment, the first computing node 112a encrypts the first smart contract 122 based on an encrypt-decrypt algorithm previously agreed with the second computing node 152a. As further described below, this allows the second computing node 152a to decrypt the first smart contract 122 using the first authentication code 126 based on the same encrypt-decrypt algorithm previously agreed with the first computing node 112a. Essentially, the first authentication code 126 acts as a unique key that can be used by the second computing node 152a to access and review the first smart contract 122.

At operation 212, first computing node 112a transmits, to the second computing node 152a, the encrypted first smart contract 122, the encrypted first network address 124, and the first authentication code 126.

In one embodiment, the first computing node 112a transmits the encrypted first smart contract 122, the encrypted first network address 124, and the first authentication code 126 in a single encoded first data file 120. In alternative embodiments, the first computing node 112a transmits the encrypted first smart contract 122, the encrypted first network address 124, and the first authentication code 126 as separate data files.

At operation 214, if a first digital signature 168 is not received from the second computing node 152a (e.g., within a pre-configured time of transmitting the first smart contract 122), method 200 proceeds to operation 206 where the first computing node 112a discards the requested data interaction and the method 200 ends here. On the other hand, if a first digital signature 168 is received from the second computing node 152a, method 200 proceeds to operation 216.

As described above, upon receiving the encrypted first smart contract 122, the encrypted first network address 124, and the first authentication code 126 from the first computing node 112a, the second computing node 152a may be configured to decrypt the first smart contract 122 using the first authentication code 126. As described above, the second computing node 152a may decrypt the first smart contract 122 based on the encrypt-decrypt algorithm previously agreed with the first computing node 112a. After decrypting the first smart contract 122, the second computing node 152a may extract the first transformation rule 123 included in the first smart contract 122 and determine whether the first transformation rule 123 is acceptable. In one embodiment, the second computing node 152a may determine whether the first transformation rule 123 is acceptable based on a pre-configured rule set for the second blockchain network 150 relating to data exchanges between a computing node 152 of the second blockchain network 150 and a computing node 112 of the first blockchain network. For example, the pre-configured rule set for the second blockchain network 150 may specify that at least X amount of the first type of data objects 134 is to be received for a unit amount of the second type of data objects 174. The second computing node 152a analyzes the first transformation rule 123 based on this pre-configured rule to determine whether the first transformation rule 123 is acceptable. As mentioned above, the first transformation rule 123 indicates that that the first computing node 112a is to transmit a first amount of the first type of data objects 134 belonging to the first user 113 in exchange for a second amount of the second type of data objects 174 belonging to the second user 153 that is to be received from the second computing node 152a. When the first transformation rule 123 satisfies the pre-configured rule set for the second blockchain network 150, the second computing node 152a determines that the first transformation rule 123 is acceptable. For example, based on the first transformation rule 123, when at least X amount of the first type of data objects 134 is to be received for a unit amount of the second type of data objects 174, the second computing node 152a determines that the first transformation rule 123 is acceptable and approves the first transformation rule 123.

It may be noted that the encrypted first network address 124 cannot be decrypted by the second computing node 152a at this stage. The encrypted first network address 124 is configured to be decrypted by a unique access token (e.g., first access token 130) which, as described below, the first computing node 112a is configured to transmit to the second computing node 152a at a later stage.

In response to determining that the first transformation rule 123 is acceptable, the second computing node generates and transmits a first digital signature 168 to the first computing node 112a. The first digital signature 168 indicates to the first computing node 112a that the second computing node 152a has approved the first transformation rule 123 that was included in the first smart contract 122.

At operation 216, first computing node 112a transmits a first access token 130 to the second computing node 152a.

As described above, after validating the first digital signature 168, the first computing node transmits a first access token 130 to the second computing node 152a. The first access token 130 is a key that can be used to decrypt the encrypted first network address 124 that was previously transmitted to the second computing node 152a.

At operation 218, first computing node 112a receives a request from the second computing node 152a to transmit the first number of the first type of data objects 134 from the first memory location within the first blockchain network 110.

At operation 220, first computing node 112a initiates transmission of the first number of the first type of data objects 134 to the second computing node 152a.

As described above, the encrypted first network address 124 is of a memory location within the first blockchain network 110 where the first type of data objects 134 associated with the first user 113 are stored. The second computing node 152a receives the first access token 130 and decrypts the encrypted first network address 124 using the first access token 130 to determine the first network address 124. Thereafter, the second computing node 152a requests the first computing node 112a to transmit the first amount of the first type of data objects 134 belonging to the first user 113 from the first network address 124. For example, the second computing node 152a transmits a request for the first amount of the first type of data objects 134 along with the first network address 124. In response to receiving the request for the first type of data objects 134, the first computing node 112a initiates a transmission of the first amount of the first type of data objects 134 to the second computing node 152a. In one embodiment, the second computing node 152a transmits the request for the first type of data objects 134 to an exchange computing node (an exchange server in the second blockchain network 150) in the second blockchain network 150 that is configured to coordinate data exchange between the first blockchain network 110 and the second blockchain network 150. In an alternative or additional embodiment, the second computing node 152a performs operations relating to the exchange computing node.

The second computing node 152a may be configured to transmit a second network address 164 of a memory location within the second blockchain network 150 where the second data objects 174 owned by the second user 153 are stored. In one embodiment, the second computing node 152a transmits an encrypted second network address 164 and separately transmits a second access token 170 to the first computing node 112a. The second access token 170 is a key that can be used to decrypt the encrypted second network address 164 that was previously transmitted to the first computing node 112a. The first computing node 112a receives the second access token 170 and decrypts the encrypted second network address 164 using the second access token 170 to determine the second network address 164. Thereafter, the first computing node 112a requests the second computing node 152a to transmit the second amount of the second type of data objects 174 belonging to the second user 153 from the second network address 164. For example, the first computing node 112a transmits a request for the second amount of the second type of data objects 174 along with the second network address 164. In response to receiving the request for the second type of data objects 174, the second computing node 152a initiates a transmission of the second amount of the second type of data objects 174 to the first computing node 112a. In one embodiment, the first computing node 112a transmits the request for the second type of data objects 174 to an exchange computing node (e.g., exchange server) within the first blockchain network 110 that is configured to coordinate data exchange between the first blockchain network 110 and the second blockchain network 150. In an alternative or additional embodiment, the first computing node 112a performs operations relating to the exchange computing node of the first blockchain network 110. In one embodiment, the second computing node 152a transmits the encrypted second network address 164 and the second access token 170 after approving the first transformation rule 123 included in the first smart contract 122.

In an example banking use case, the disclosed system and method may be used to exchange crypto currency between two different blockchain networks that support different type of crypto currency. For example, the first type of data objects may represent a first type of crypto currency and the second type of data objects may represent a second type of crypto currency. The first transformation rule 123 and the second transformation rule 163 may represent crypto exchange rates.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a first computing node of a first blockchain network comprising a first plurality of computing nodes; and
   a processor communicatively coupled to the first computing node and configured to:
   transmit, to a second computing node of a second blockchain network comprising a second plurality of computing nodes, a request to perform a data interaction with the second computing node, wherein the data interaction comprises exchange of data between the first computing node and the second computing node;
   receive, from the second computing node, an acknowledgement indicating that the second computing node is ready to perform the data interaction with the first computing node;
   in response to receiving the acknowledgement:
      generate a first smart contract comprising information relating to the data interaction, wherein the information relating to the data interaction at least comprises a first transformation rule indicating that a first number of a first type of data objects is to be transmitted by the first computing node in exchange for a second number of a second type of data objects received from the second computing node;
      generate an encrypted first network address of a first memory location within the first blockchain network where the first type of data objects is stored; and
      generate a first authentication code for the data interaction;
   encrypt the first smart contract using the first authentication code to generate an encrypted first smart contract;
   transmit to the second computing node the encrypted first smart contract, the encrypted first network address, and the first authentication code, wherein the second computing node decrypts the first smart contract using the first authentication code;
   receive a first digital signature from the second computing node, wherein the first digital signature indicates that the second computing node has approved the first transformation rule included in the first smart contract;
   after receiving the first digital signature, transmit to the second computing node a first access token that is to be used to decrypt the encrypted first network address of the first memory location within the first blockchain network where the first type of data objects is stored;

receive, from the second computing node, a first request for transmission of the first number of the first type of data objects from the first memory location within the first blockchain network; and
in response to receiving the request, initiate transmission of the first number of the first type of data objects to the second computing node from the first memory location within the first blockchain network.

2. The system of claim 1, wherein the processor is further configured to:
encode the encrypted first smart contract, the encrypted first network address, and the first authentication code using a synthetic DNA synthesis process to generate an encoded first data file, wherein the encoded first data file comprises one or more synthetic DNA sequences that represent encoded data; and
transmit the encoded first data file to the second computing node, wherein the second computing node decodes the one or more synthetic DNA sequences in the encoded first data file to extract the encrypted first smart contract, the encrypted first network address, and the first authentication code.

3. The system of claim 1, wherein the processor is further configured to:
receive from the second computing node:
a second smart contract comprising information relating to the data interaction, wherein the information comprised in the second smart contract at least comprises a second transformation rule indicating the second number of the second type of data objects to be transmitted by the second computing node to the first computing node in exchange for the first number of the first type of data objects to be received by the second computing node from the first computing node;
an encrypted second network address of a second memory location within the second blockchain network where the second type of the data objects is stored; and
a second authentication code for the data interaction;
decrypt the second smart contract using the second authentication code;
receive an indication that the second transformation rule in the second smart contract is acceptable;
in response to receiving the indication, generate a second digital signature;
transmit the second digital signature and the second authentication code to the second computing node, wherein the second digital signature indicates that the first computing node has approved the second transformation rule included the second smart contract;
receive, from the second computing node, a second access token that is to be used to decrypt the encrypted second network address of the second memory location within the second blockchain network where the second type of the data objects is stored;
decrypt the encrypted second network address using the second access token;
transmit, to the second computing node, a second request for transmission of the second number of the second type of the data objects from the second network address in the second blockchain network; and
after transmitting the second request, receive, from the second computing node, the second number of the second type of data objects from the second memory location within the second blockchain network.

4. The system of claim 3, wherein the processor is further configured to:
receive an encoded second data file from the second computing node, wherein the encoded second data file is encoded using a synthetic DNA synthesis process and comprises one or more synthetic DNA sequences representing the encrypted second smart contract, the encrypted second network address, and the second authentication code; and
decode the one or more synthetic sequences in the encoded second data file to extract the encrypted second smart contract, the encrypted second network address, and the second authentication code.

5. The system of claim 1, wherein the processor is further configured to:
receive, from the second computing node, the first digital signature along with the first authentication code that was previously transmitted to the second computing node; and
validate the first digital signature by matching the first digital signature received from the second computing node with the first digital signature transmitted to the second computing node.

6. The system of claim 5, wherein the processor is further configured to:
transmit the first access token to the second computing node in response to successfully validating the first digital signature.

7. The system of claim 5, wherein the first digital signature and the first authentication code is received from the second computing node with the first smart contract that was previously transmitted to the second computing node.

8. A method for performing a data interaction, the method comprising:
transmit, to a second computing node of a second blockchain network comprising a second plurality of computing nodes, a request to perform a data interaction with the second computing node, wherein the data interaction comprises exchange of data between a first computing node of a first blockchain network and the second computing node, wherein the first blockchain network comprises a first plurality of computing nodes;
receive, from the second computing node, an acknowledgement indicating that the second computing node is ready to perform the data interaction with the first computing node;
in response to receiving the acknowledgement:
generate a first smart contract comprising information relating to the data interaction, wherein the information relating to the data interaction at least comprises a first transformation rule indicating that a first number of a first type of data objects is to be transmitted by the first computing node in exchange for a second number of a second type of data objects received from the second computing node;
generate an encrypted first network address of a first memory location within the first blockchain network where the first type of data objects is stored; and
generate a first authentication code for the data interaction;
encrypt the first smart contract using the first authentication code to generate an encrypted first smart contract;
transmit to the second computing node the encrypted first smart contract, the encrypted first network address, and the first authentication code;

receive a first digital signature from the second computing node, wherein the first digital signature indicates that the second computing node has approved the first transformation rule included in the first smart contract;

after receiving the first digital signature, transmit to the second computing node a first access token that is to be used to decrypt the encrypted first network address of the first memory location within the first blockchain network where the first type of data objects is stored;

receive, from the second computing node, a first request for transmission of the first number of the first type of data objects from the first memory location within the first blockchain network; and in response to receiving the request, initiate transmission of the first number of the first type of data objects to the second computing node from the first memory location within the first blockchain network.

9. The method of claim 8, further comprising:

encoding the encrypted first smart contract, the encrypted first network address, and the first authentication code using a synthetic DNA synthesis process to generate an encoded first data file, wherein the encoded first data file comprises one or more synthetic DNA sequences that represent encoded data; and transmitting the encoded first data file to the second computing node, wherein the second computing node decodes the one or more synthetic DNA sequences in the encoded first data file to extract the encrypted first smart contract, the encrypted first network address, and the first authentication code.

10. The method of claim 8, further comprising:

receiving from the second computing node:
- a second smart contract comprising information relating to the data interaction, wherein the information comprised in the second smart contract at least comprises a second transformation rule indicating the second number of the second type of data objects to be transmitted by the second computing node to the first computing node in exchange for the first number of the first type of data objects to be received by the second computing node from the first computing node;
- an encrypted second network address of a second memory location within the second blockchain network where the second type of the data objects is stored; and
- a second authentication code for the data interaction;

decrypt the second smart contract using the second authentication code;

receive an indication that the second transformation rule in the second smart contract is acceptable;

in response to receiving the indication, generating a second digital signature;

transmitting the second digital signature and the second authentication code to the second computing node, wherein the second digital signature indicates that the first computing node has approved the second transformation rule included the second smart contract;

receiving, from the second computing node, a second access token that is to be used to decrypt the encrypted second network address of the second memory location within the second blockchain network where the second type of the data objects is stored;

decrypting the encrypted second network address using the second access token;

transmitting, to the second computing node, a second request for transmission of the second number of the second type of the data objects from the second network address in the second blockchain network; and after transmitting the second request, receiving, from the second computing node, the second number of the second type of data objects from the second memory location within the second blockchain network.

11. The method of claim 10, further comprising:

receiving an encoded second data file from the second computing node, wherein the encoded second data file is encoded using a synthetic DNA synthesis process and comprises one or more synthetic DNA sequences representing the encrypted second smart contract, the encrypted second network address, and the second authentication code; and decoding the one or more synthetic sequences in the encoded second data file to extract the encrypted second smart contract, the encrypted second network address, and the second authentication code.

12. The method of claim 8, further comprising:

receiving, from the second computing node, the first digital signature along with the first authentication code that was previously transmitted to the second computing node; and validating the first digital signature by matching the first digital signature received from the second computing node with the first digital signature transmitted to the second computing node.

13. The method of claim 12, further comprising:

transmitting the first access token to the second computing node in response to successfully validating the first digital signature.

14. The method of claim 12, wherein the first digital signature and the first authentication code is received from the second computing node with the first smart contract that was previously transmitted to the second computing node.

15. A non-transitory computer-readable medium storing instructions that when executed by a processor cause the processor to:

transmit, to a second computing node of a second blockchain network comprising a second plurality of computing nodes, a request to perform a data interaction with the second computing node, wherein the data interaction comprises exchange of data between a first computing node of a first blockchain network and the second computing node, wherein the first blockchain network comprises a first plurality of computing nodes;

receive, from the second computing node, an acknowledgement indicating that the second computing node is ready to perform the data interaction with the first computing node;

in response to receiving the acknowledgement:
- generate a first smart contract comprising information relating to the data interaction, wherein the information relating to the data interaction at least comprises a first transformation rule indicating that a first number of a first type of data objects is to be transmitted by the first computing node in exchange for a second number of a second type of data objects received from the second computing node;
- generate an encrypted first network address of a first memory location within the first blockchain network where the first type of data objects is stored; and
- generate a first authentication code for the data interaction;

encrypt the first smart contract using the first authentication code to generate an encrypted first smart contract;

transmit to the second computing node the encrypted first smart contract, the encrypted first network address, and the first authentication code;

receive a first digital signature from the second computing node, wherein the first digital signature indicates that the second computing node has approved the first transformation rule included in the first smart contract;

after receiving the first digital signature, transmit to the second computing node a first access token that is to be used to decrypt the encrypted first network address of the first memory location within the first blockchain network where the first type of data objects is stored;

receive, from the second computing node, a first request for transmission of the first number of the first type of data objects from the first memory location within the first blockchain network; and in response to receiving the request, initiate transmission of the first number of the first type of data objects to the second computing node from the first memory location within the first blockchain network.

16. The non-transitory computer-readable medium of claim 15, wherein the instructions further cause the processor to:

encode the encrypted first smart contract, the encrypted first network address, and the first authentication code using a synthetic DNA synthesis process to generate an encoded first data file, wherein the encoded first data file comprises one or more synthetic DNA sequences that represent encoded data; and transmit the encoded first data file to the second computing node, wherein the second computing node decodes the one or more synthetic DNA sequences in the encoded first data file to extract the encrypted first smart contract, the encrypted first network address, and the first authentication code.

17. The non-transitory computer-readable medium of claim 15, wherein the instructions further cause the processor to:

receive from the second computing node:
a second smart contract comprising information relating to the data interaction, wherein the information comprised in the second smart contract at least comprises a second transformation rule indicating the second number of the second type of data objects to be transmitted by the second computing node to the first computing node in exchange for the first number of the first type of data objects to be received by the second computing node from the first computing node;
an encrypted second network address of a second memory location within the second blockchain network where the second type of the data objects is stored; and
a second authentication code for the data interaction;

decrypt the second smart contract using the second authentication code;

receive an indication that the second transformation rule in the second smart contract is acceptable;

in response to receiving the indication, generate a second digital signature;

transmit the second digital signature and the second authentication code to the second computing node, wherein the second digital signature indicates that the first computing node has approved the second transformation rule included the second smart contract;

receive, from the second computing node, a second access token that is to be used to decrypt the encrypted second network address of the second memory location within the second blockchain network where the second type of the data objects is stored;

decrypt the encrypted second network address using the second access token;

transmit, to the second computing node, a second request for transmission of the second number of the second type of the data objects from the second network address in the second blockchain network; and after transmitting the second request, receive, from the second computing node, the second number of the second type of data objects from the second memory location within the second blockchain network.

18. The non-transitory computer-readable medium of claim 17, wherein the instructions further cause the processor to:

receive an encoded second data file from the second computing node, wherein the encoded second data file is encoded using a synthetic DNA synthesis process and comprises one or more synthetic DNA sequences representing the encrypted second smart contract, the encrypted second network address, and the second authentication code; and decode the one or more synthetic sequences in the encoded second data file to extract the encrypted second smart contract, the encrypted second network address, and the second authentication code.

19. The non-transitory computer-readable medium of claim 15, wherein the instructions further cause the processor to:

receive, from the second computing node, the first digital signature along with the first authentication code that was previously transmitted to the second computing node; and validate the first digital signature by matching the first digital signature received from the second computing node with the first digital signature transmitted to the second computing node.

20. The non-transitory computer-readable medium of claim 19, wherein the instructions further cause the processor to:

transmit the first access token to the second computing node in response to successfully validating the first digital signature.

* * * * *